United States Patent [19]

Lesniak

[11] Patent Number: 5,387,976
[45] Date of Patent: Feb. 7, 1995

[54] METHOD AND SYSTEM FOR MEASURING DROP-VOLUME IN INK-JET PRINTERS

[75] Inventor: Christopher M. Lesniak, Vancouver, Wash.

[73] Assignee: Hewlett-Packard Company, Palo Alto, Calif.

[21] Appl. No.: 144,988

[22] Filed: Oct. 29, 1993

[51] Int. Cl.$^6$ .............................................. G01B 11/28
[52] U.S. Cl. ..................................... 356/379; 356/380; 347/19; 347/100
[58] Field of Search ............... 356/379, 380, 394, 445, 356/446, 447, 448; 347/19, 6, 14, 81, 100, 107; 106/20 D, 20 R; 101/45; 400/56, 126; 73/149, 861.41

[56] References Cited

U.S. PATENT DOCUMENTS

| | | | |
|---|---|---|---|
| 4,382,262 | 5/1983 | Savit | 106/20 D |
| 4,628,728 | 12/1986 | Taylor et al. | 73/149 |
| 4,678,336 | 7/1987 | Tsunoda | 356/380 |
| 4,829,898 | 5/1989 | Wieland | 101/DIG. 45 |

FOREIGN PATENT DOCUMENTS 0017308  2/1983  Japan .................... 356/380

Primary Examiner—Hoa Q. Pham

[57] ABSTRACT

This invention involves to a method for measuring drop-volume in an ink-jet printhead. A series of print samples comprised of multiple drops of ink are printed on a recording media. The number of ink drops per sample is reduced for subsequent print samples to produce a series of print samples with varying amounts of ink content. The samples include a solid character to help contrast the increasingly ink depleted regions. The series is visually or optically analyzed to detect changes in optical density among the individual print samples. From these changes, the drop-volume for an ink-jet printhead can be determined. A printing system for automatically self-analyzing and self-correcting for drop-volume is also described.

13 Claims, 5 Drawing Sheets

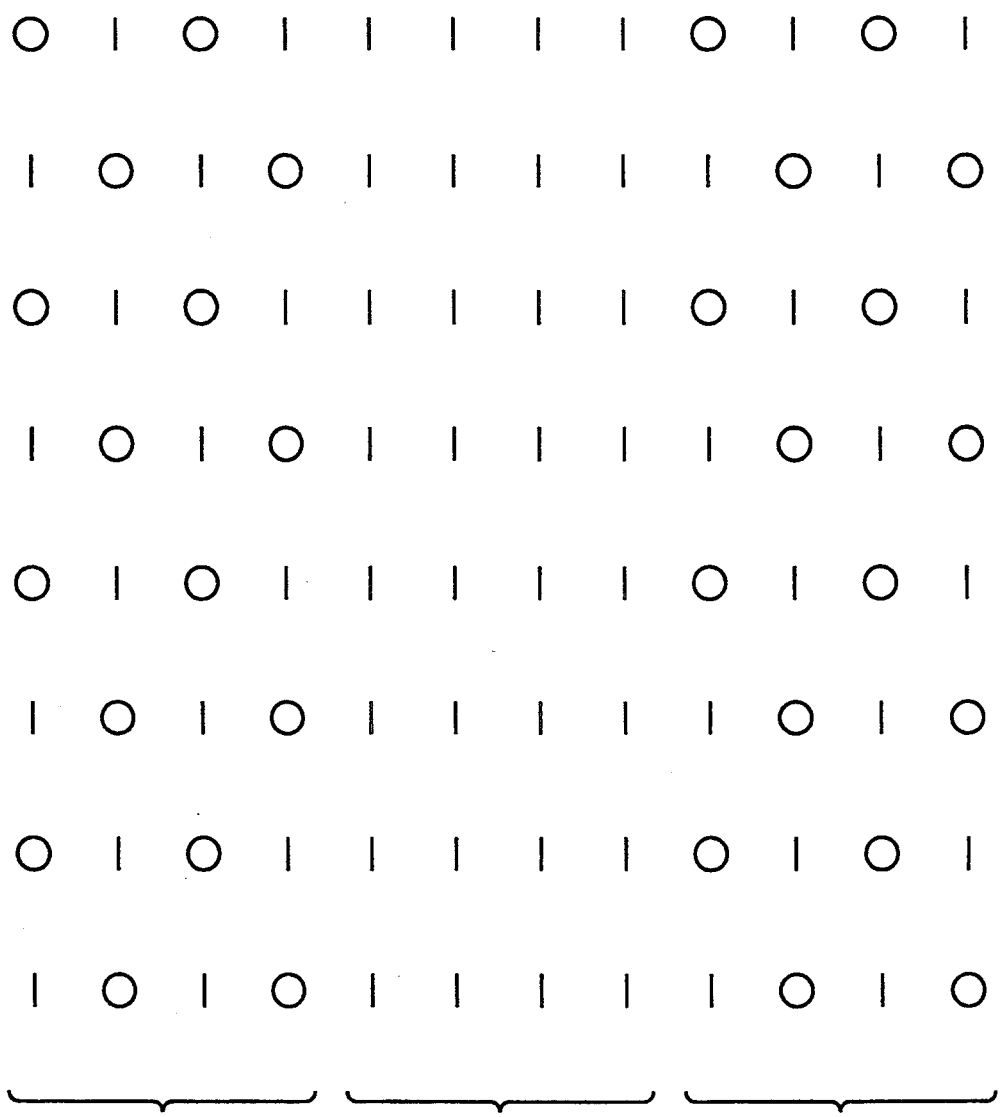

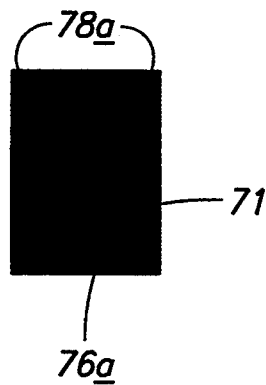
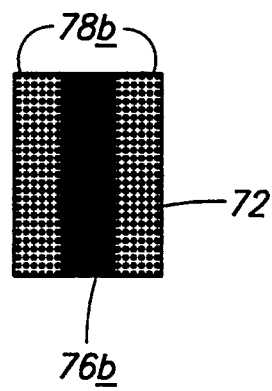
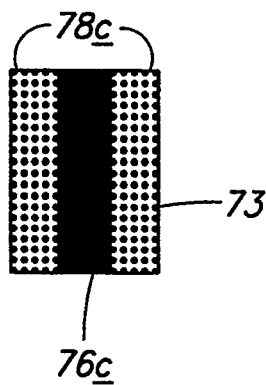
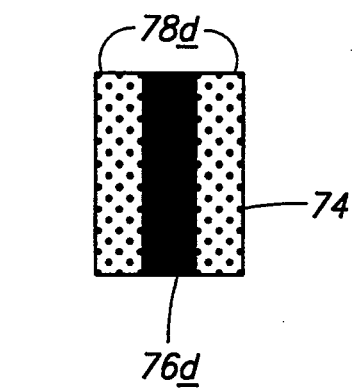
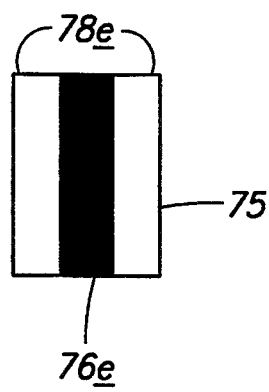

METHOD AND SYSTEM FOR MEASURING DROP-VOLUME IN INK-JET PRINTERS

TECHNICAL FIELD

This invention relates to ink-jet printers.

BACKGROUND OF THE INVENTION

An ink-jet printer is a type of non-impact printer which forms characters and other images by controllably spraying drops of ink from a printhead. One conventional type of ink-jet printhead consists of a replaceable cartridge or pen which is mounted to a movable carriage. The pen controllably ejects liquid ink through multiple nozzles in the form of annular drops which travel across a small air gap and land on a recording media. The ink drops dry shortly thereafter to form in combination the desired printed images.

One problem associated with ink-jet printers concerns the amount of ink deposited from the pen during the formation of each drop. The quantity of deposited ink, commonly referred to as the "drop-volume" of the pen; can vary significantly from pen to pen. This wide variation in drop-volume detrimentally impacts print quality, ink dry time, and pen life. In general, variations in pen drop-volumes are caused by tolerances inherent in manufacturing or other pen characteristics. On the other hand, for any given pen, the drop-volume remains fairly constant over the majority of the life of that pen. Accordingly, it would be desirable to develop a technique for detecting the drop-volumes of different pens.

One prior approach to solving the above problem is simply to produce pens according to tighter manufacturing tolerances. Pens with higher precision specifications tend to have more consistent drop-volumes. Unfortunately, this approach involves expensive manufacturing equipment, thereby driving up the production cost of such pens.

Another proposed solution involves computing drop-volume by measuring the optical density of a solid printed area of ink. It is difficult, however, to obtain a precise reading of drop-volume from optical density because there is substantial variability in the measurement. The optical density of the printed solid area is dependent on other factors apart from drop-volume, such as the recording media and ink, and thus is less effective at isolating and deriving the pen drop-volume.

A related approach is to print a line of single ink drops and measure its width. Pens having a comparatively high drop-volume would produce a wider line, whereas pens having a comparatively low drop-volume would yield a narrower line. This measurement, however, tends to be noisy and often fails to produce repeatable results.

Another prior technique involves deducing drop-volume by measuring the mass of the ink drops ejected from the pen. This technique has a drawback in that it requires expensive equipment, such as a precision balance, to accurately weigh ink drops. Additionally, the technique is time-consuming and not suitable for automation into a high-speed manufacturing environment. As a result, the method cannot practically be implemented in the manufacturing of low-cost ink-jet printers.

None of the above prior solutions have proven effective for providing a low-cost approach to accurately determining drop-volume of ink-jet pens. Accordingly, it is an objective of this invention to provide a method for detecting nominal drop-volume of a pen. It is also an objective to compensate for various pen drop-volumes to yield more consistent print quality, ink dry time, and pen life.

DISCLOSURE OF THE INVENTION

According to one aspect of this invention, a method for measuring drop-volume in an ink-jet printhead comprises the following steps: (1) printing a series of print samples on a recording media, individual print samples being formed by depositing individual drops of ink; (2) the printing including changing the number of ink drops deposited in the individual print samples within the series to produce individual print samples with varying amounts of ink content; (3) analyzing the series of print samples to detect changes in ink content among the print samples; and (4) determining drop-volume for the ink-jet printhead based upon the detected changes in ink content among the print samples within the series.

According to another aspect of this invention, an ink-jet printing system comprises a platen and an ink-jet printhead disposed adjacent to, but spaced from, the platen to permit passage of a recording media therebetween. The printhead has multiple nozzles for depositing drops of ink onto the recording media to form printed images. The printing system further includes an optical sensor having a light source oriented to emit a light beam toward the platen and a light sensitive detector aligned to detect reflected light. A memory is employed to store a plurality of test print patterns that define a number and position of multiple ink drops to be deposited by the printhead. Individual print patterns have a character region and a depletion region whereby the number and position of ink drops to be deposited in the depletion regions vary among the test print patterns.

The ink-jet printhead is operable during a test mode to print a series of print samples according to the test print patterns stored in the memory. The printhead deposits a substantially constant number of ink drops within first print sample areas (which are the printed form of the character regions of the test print patterns) and a varying number of ink drops within second print sample areas (which are the printed form of the depletion regions of the test print patterns). In this manner, the second print sample areas experience selected varying degrees of ink depletion as compared to the first print sample areas. The optical sensor is then operable during the test mode to scan the print samples and detect changes in optical density between the first print sample areas and the second print sample areas.

BRIEF DESCRIPTION OF THE DRAWINGS

Preferred embodiments of the invention are described below with reference to the following accompanying drawings depicting examples embodying the best mode for practicing the invention.

FIG. 3 illustrates a test print pattern defining an "I" or bar-shaped character and an ink depleted background region.

FIGS. 4A–4E illustrate a series of print samples having an "I" or bar-shaped character overlaid on regions experiencing varying degrees of ink depletion.

DETAILED DESCRIPTION OF THE PREFERRED EMBODIMENTS

Figure 1:
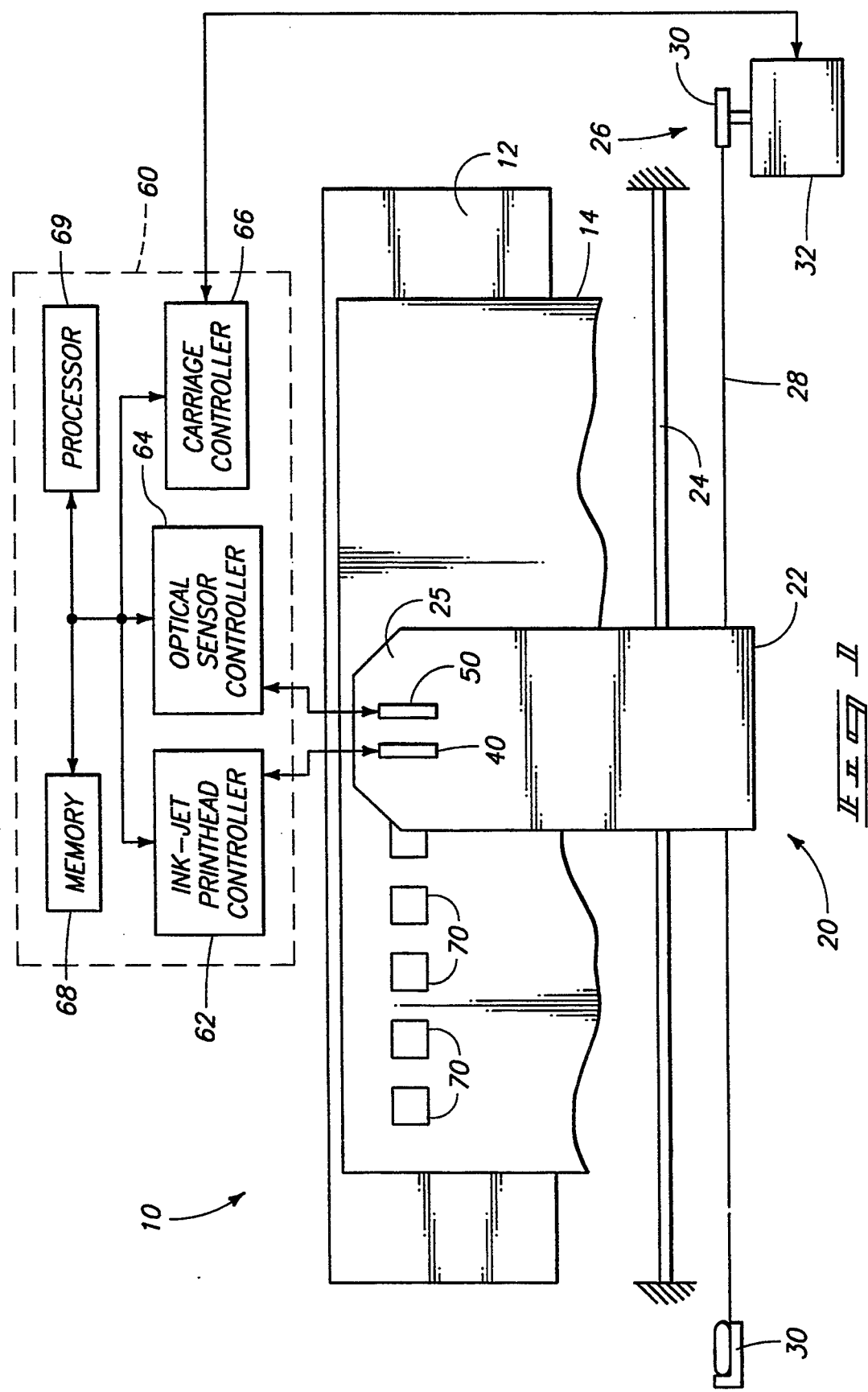
FIG. 1 is a diagrammatic illustration of a printing system for an ink-jet printer according to this invention.

FIG. 1 shows an ink-jet printing system 10 of an ink-jet printer. System 10 includes a platen 12, a shuttle assembly 20, an ink-jet printhead 40, an optical sensor 50, and a control subsystem 60. Platen 12 is preferably stationary and supports a recording media 14 during printing. Recording media 14 may be a continuous form or individual sheet stock, and can consist of paper, adhesive-backed labels, or other types of printable matter. A media feed mechanism (not shown), such as friction rollers or a tractor feed system, is used to drive the media through the printer.

Shuttle assembly 20 includes a carriage 22 slidably mounted on a fixed, elongated rod 24 to move bidirectionally across the platen 12. Carriage 22 has a nose section 25 that is adjacent to, but spaced from, the platen 12 to permit passage of the recording media 14 therebetween. Shuttle assembly 20 further includes a drive subassembly 26 that is mechanically coupled to maneuver the drive carriage 22 back and forth along rod 24. Drive subassembly 26 includes a wire or belt 28 attached to carriage 22 and wound around opposing pulleys 30, and a motor 32 (DC or stepper) connected to power one of the pulleys. The shuttle assembly 20 is illustrated in one typically form for explanation purposes and its construction is well known in the art. However, other types of shuttle assembly configurations may be employed in this invention.

Figure 5:
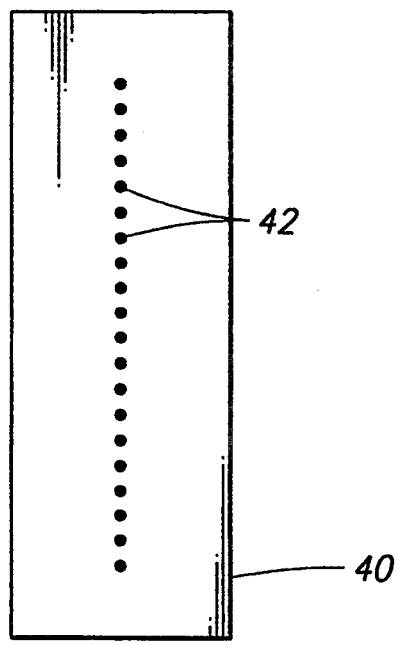
FIG. 5 is a diagrammatic illustration of an ink-jet printhead having an array of nozzles.

Ink-jet printhead 40 is mounted on nose section 25 of carriage 22 in juxtaposition with platen 12. Printhead 40 is of conventional construction and thus is only diagrammatically illustrated as a block on nose section 25 of carriage 22. As shown in FIG. 5, printhead 40 has multiple nozzles (e.g. 48 nozzles 42) which can be arranged in a variety of configurations. Example nozzle arrangements include a single vertical column (i.e., an in-line printhead), two side-by-side vertical columns (e.g., parallel or staggered), or a matrix configuration. Individual nozzles are selectively fired upon application of electrical energy pulses thereto. When a nozzle is fired, ink is sprayed or ejected across an air separation gap and onto the media to form approximately annular drops thereon. The drops are very small as ink-jet printers commonly print within a range of 180 to 600 dots per inch (dpi). The tiny drops combine to form printed images.

According to one type of known construction, printhead 40 is embodied as one or more replaceable, disposable pens. A single pen is used for monocolor print (such as black), whereas multiple pens are used for multicolor print. Individual pens typically comprise an ink supply chamber and in ink distribution network (i.e., the ink-jet nozzles, conduits from the supply chamber to the nozzles, and associated firing mechanisms). In this configuration, the replaceable pens essentially form the entire printhead. Since this is the preferred operating environment, the terms "pen" and "printhead" as used in this disclosure are substantially interchangeable.

In other known designs, however, all or part of the printhead is permanent and not readily replaceable as a disposable component. For example, some ink-jet printers employ a printhead having permanently mounted ink-jet nozzles and firing means, wherein only the ink supply chamber is replaceable. As will be appreciated from the continuing discussion, however, this invention can be used for all types of ink-jet printers.

Ink-jet pen 40 has an associated drop-volume. As used in this disclosure, the term "drop-volume" refers to the quantity of ink deposited by the pen in a given image formation. Drop-volume can be related to a per drop level, in that pens having relatively high drop-volume form a larger ink drop whereas pens having relatively low drop-volume form a smaller ink drop. This concept is discussed below in more detail with reference to FIGS. 2A-2D.

Figure 6:
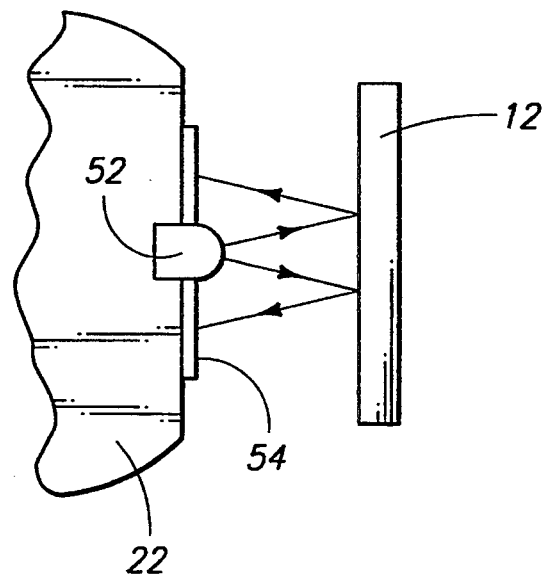
FIG. 6 is a diagrammatic illustration of an optical sensor used in the FIG. 1 printing system.

An optical sensor 50 is also mounted on carriage 22 to be positionable above media 14. As shown in FIG. 6, optical sensor 50 includes a light source 52 (e.g., photo-emitter, LED, laser diode, super luminescent diode, fiber optic source) oriented to emit a light beam toward platen 12 and a light sensitive detector 54 (e.g., photoreceiver, charged couple device, photodiode) aligned to detect light reflected from the platen or media. Optical sensor 50 is preferably mounted adjacent to, and in substantial alignment with, the print nozzles of the printhead 40 to monitor lines of text or other images that have already been printed.

The control subsystem 60 of printing system 10 consists of various components used to monitor and control operation of the ink-jet printing system. Control subsystem 60 includes an ink-jet printhead controller 62, an optical sensor controller 64, a carriage controller 66, a memory 68, and a processor 69. These components are illustrated in block form for clarity of discussion. When assembled, control subsystem 60 can be embodied as one or more microprocessors, microcontrollers, ASICs, or other circuitry and logic.

Ink-jet printhead controller 62 is electrically coupled to printhead 40 to manage the tasks associated with transforming digital data downloaded to the printer into desired patterns to be applied on the recording media. Such tasks include selecting the individual printhead nozzles to form the prescribed image and controlling the duration and magnitude of energy pulses used to fire the selected nozzles.

Optical sensor controller 64 is electrically coupled to monitor signals generated by optical sensor 50. Carriage controller 66 is configured to manage motor 32 and thereby controllably position carriage 22 at selected locations relative to platen 12 or media 14. Memory 68 is preferably a non-volatile memory (such as a ROM) which stores a plurality of test print patterns that are employed during a test mode, as will be discussed below in more detail with reference to FIG. 3.

The one or more ink-jet pens employed in printing system 10 have life expectancies that are considerably less than that of the entire ink-jet printer. The pens are therefore designed to be replaceable so that numerous pens are typically used throughout the longer life of one printer. A known drawback is that the ink-jet pens deliver significantly different drop-volumes due to their inherent mechanical design and tolerances. As but one example, the orifice size of individual nozzles tend to vary considerably among ink-jet pens, yielding inconsistent drop-volume. Accordingly, when a new pen is substituted for an empty pen, the print quality can change considerably simply because the drop-volumes of the pens are different, even though every other printing parameter remains the same.

Figure 2A:
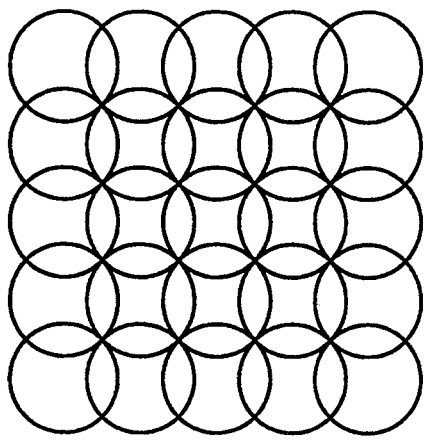
FIGS. 2A–2D illustrate print samples from pens having different drop-volumes.
Figure 2B:
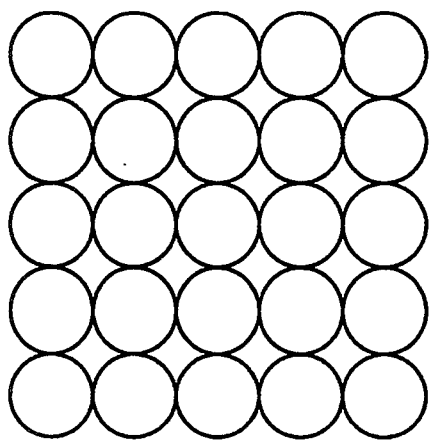
Figure 2C:
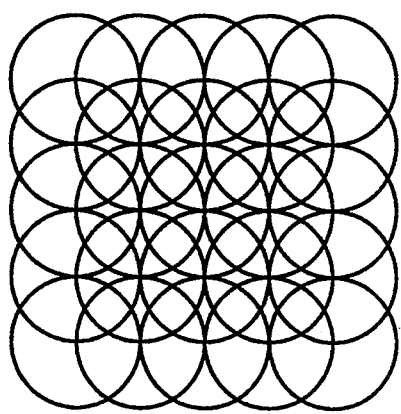

To demonstrate this point, FIGS. 2A–2C illustrate identical print patterns deposited by three different pens having different drop-volumes. For purposes of discussion, each print pattern consists of a 5×5 matrix of 25 total drops. The ink drops are represented by round circles, with circle size indicating the area covered by the ink drops. FIG. 2A shows an ideal drop-volume for an ink-jet pen. The drops deposited by the ink-jet pen are sufficiently large to slightly overlap with neighboring drops and effectively cover any white-space between them. This drop-volume yields high quality printed images which are clear, precise, and can be scanned or reproduced without any significant degradation induced from the image itself.

FIG. 2B shows the pattern deposited by a pen having a relatively low drop-volume. The dot size, as represented by circle circumference, is smaller. Thus, the ink drops do not overlap with neighboring drops to fill-in the interlying white-space. Because the drops are small and close together (for standard print densities of 180–600 dpi), the white-space is not visible to the human eye. However, the resulting image will appear washed out or grey. A pen with too low of a drop-volume is undesirable because it reduces the optical density of the resulting image and produces other artifacts that degrade print quality. Therefore, the distribution of pen drop-volumes is usually skewed to prevent this condition, causing many of the pens to have a higher than optimum drop-volume, such as that shown in FIG. 2C.

FIG. 2C shows the identical 5×5 pattern printed by a pen having a relatively high drop-volume. The drops are sized in this example to overlap approximately half of the area covered by all neighboring drops. Although the resulting image is desirably dark and not washed out, the pen has other drawbacks such as a shorter utility life and higher ink dry times which are both caused by depositing higher than ideal volumes of ink. In addition, print quality for graphic images can be adversely affected as such pens are less able to print lighter or so-called "gray-scale" images.

Figure 2D:
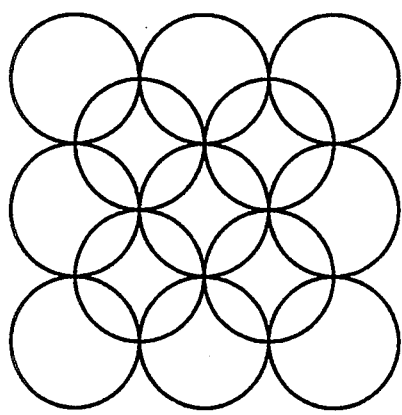

If the drops are sufficiently large (such as the drops in FIG. 2C), they may overlap an effective amount that some interior drops can be eliminated without introducing any white-space or reducing optical density. To illustrate this aspect, FIG. 2D shows the matrix pattern formed by the high drop-volume pen of FIGS. 2C, but with 12 drops removed from the interior. This represents a reduction of ink, or "ink depletion", of nearly 50% of the drops without any significant degradation in print quality.

This invention concerns a system and method of compensating for various drop-volumes inherent in different ink-jet pens. The invention uses the above described concept of overlapping drops, and the ability to eliminate or change the number of drops deposited in a pattern without substantially affecting the image. In general, one method involves printing a series of print samples on a recording media. The number of drops of ink deposited in the individual print samples are changed to produce individual print samples with varying amounts of ink content. For instance, fewer and fewer ink drops are deposited in each subsequent print sample so that the print samples experience progressively greater ink depletion from initial print samples of the series to later print samples of the series. The print samples can then be analyzed, preferably via visual observation, to detect changes in ink content among the print samples. Drop-volume for the ink-jet pen is determined based upon the detected changes in ink content in the series of print samples.

A more specific example of this invention according to a preferred embodiment will be described with reference to FIGS. 1, 3, and 4A–4E. Ink-jet printing system 10 is configured to operate in a test mode capable of determining nominal drop-volume of the ink-jet pen or printhead 40. During the test mode, the ink-jet printhead 40 prints a series of print samples 70 (FIG. 1) according to masks or test print patterns stored in non-volatile memory 68. The test print patterns define the number and position (i.e., the overall pattern) of the ink drops to be deposited by the printhead. Although the test print patterns and corresponding print samples can be constructed of any arbitrary design, whereby the printing system simply detects a change in ink content or optical density, the test patterns and print samples preferably contain an identifiable character or pattern which can be used to contrast the change in optical density.

FIG. 3 shows an example test print pattern 80 selected from a series of print patterns. The "1s" and "0s" represent pixel information, whereby a "1" bit translates to deposition of an ink drop (i.e., ink-jet printhead controller 62 will cause printhead 40 to fire a corresponding nozzle to print the desired dot) and a "0" bit translates to no deposition of an ink drop. Print pattern 80 has a character region 82, which is illustrated as defining the "I" or bar-shaped character, and a depletion region 84 outside of the character region. The character region 82 remains substantially unchanged throughout the series of test print patterns whereas the depletion region 84 changes from pattern to pattern. As shown in FIG. 3, depletion region 84 will yield a 50% ink depletion in the associated print sample area as approximately half of the drops are removed from the region (as indicated by the "0s").

FIGS. 4A–4E illustrate individual print samples 71–75, respectively, contained in series 70 of FIG. 1. The print samples 71–75 are comprised of multiple ink drops which are preferably of constant size throughout the drop-volume testing process. Individual print samples have respective first print sample areas 76a–76e that are representative of the character regions 82 of associated test print patterns 80 (FIG. 3). The first print sample areas 76a–76e are preferably solid, with a maximum deposition of drops, and contain a substantially constant number of ink drops throughout the series. Print samples 71–75 also have second print sample areas 78a–78e, respectively, that are representative of the depletion regions 84 of test print patterns 80. The second print sample areas 78a–78e have a varying number of ink drops to produce varying degrees of ink depletion as compared to the first print sample areas.

FIG. 4A shows a print sample 71 wherein all possible drops have been deposited to thereby form a sample of maximum ink content. There is no detectable contrast between the first print sample area 76a and the second print sample area 78a. FIG. 4B shows a subsequently deposited print sample 72 wherein the second print sample area 78b is depleted by a predetermined percentage of the original corresponding area 78a. That is, fewer drops of ink are deposited in second print sample area 78b as compared to the number of ink drops deposited in second print sample area 78a of FIG. 4A.

FIG. 4C shows a print sample 73 that is deposited subsequent to that of FIG. 4B, wherein the second print sample area 78c is again depleted by a predetermined amount (i.e., it contains less ink drops than were deposited in the second area 78c). FIGS. 4D and 4E repeat the trend until the entire second print sample area 78e is substantially void of ink drops. As a result of the systematic depletion, the volume of ink applied to the second print sample areas 78a–78e is incrementally reduced. The number of samples and rate of depletion in this example series is exaggerated to demonstrate the method and system of this invention. In practice, a series of 10–20 samples are printed with relatively slight depletion change between each pattern. An example depletion rate per print sample is approximately 3%–8%, with 5% being most preferred.

As increasingly fewer ink drops are printed, there evolves a contrast between the darkened bar-shaped character and the increasingly lightened depletion region. This evolving contrast produces an observable change in optical density among the individual print samples. This change can be detected visually by the user, or through the use of an electronic scanner (such as a bar code reader) or the like. Once the bar-shaped character is recognized, the user will know that the depletion area 78 contains too few ink drops for a given drop-volume. The user can then input information to the printer, directly or through the interface of a computer, and the printer will compensate accordingly for the drop-volume of the pen.

It should be recognized that the above-described process could be reversed, whereby more ink drops are added in subsequent print samples and the series is analyzed for a transition from identifiable contrast to non-identifiable contrast. Additionally, the print samples could be formed without darkened character regions overlaid on the depleted background areas.

According to another aspect of this invention, optical sensor 50 on carriage 22 can be used during the test mode to scan print samples 70. Optical sensor 50 detects changes in optical density as the second print sample area 78 becomes adequately depleted in relation to the first print sample area 76. The use of a vertical bar-shaped character enhances the optical sensor's ability to detect the earliest identifiable contrast between the two sample areas 76 and 78. Optical sensor controller 64 and processor 69 monitor change in signal level output by sensor 50. The signal varies as the bar-shaped character becomes increasingly distinguishable from the depletion area. Once the signal reaches a desired level (indicative of optically identifiable contrast), control subsystem 60 identifies the print pattern used to print the transitional sample.

Since the number of depleted drops is known, the drop-volume of a pen can be computed. The specific relationship between drop-volume and depletion can be determined empirically according to the following function:

$$\text{Drop-Volume} = f(d, i, p)$$

where d represents depletion, i represents the type of ink, and p represents the printing system used. The drop-volume is computed by processor 69 of control subsystem 60 according to this function.

According to this design, the printing system 10 automatically self-analyzes for drop-volume (such as each time a pen is replaced). Once the control subsystem determines the drop-volume of the new pen, it automatically adjusts the operating parameters of the printer to yield a desired drop-volume for the ink-jet printhead. Example parameters include printhead temperature, the amount of energy employed to fire a printhead nozzle, and ink viscosity. In this manner, if the pen has a relatively low drop-volume, the user or automatic printer can adjust the temperature or energy level used to eject the individual ink drops to thereby increase the amount of ink deposited in each drop. Another adjustment technique to compensate for pen drop-volume is to deplete all subsequent images by a selected percentage of ink (or drops) without degrading print quality of the images.

The method and system of this invention have several advantages. First, this invention provides a simple, low-cost technique for determining the drop-volume of a pen without any sophisticated, external measurement hardware. At the simplest level, the user can activate the test mode and print out a series of print samples. The user can then visually inspect the samples, select the appropriate drop-volume, and input the information into the printer. At a more sophisticated level, the print samples can be scanned by an optical electronic scanner.

Second, the system of this invention affords an inexpensive automated version that can self-analyze pen drop-volume and self-adjust to yield a more consistent print quality, ink dry time, and pen life.

Third, this invention can be used to provide an effective, fast, and inexpensive technique for monitoring pen drop-volume during the manufacturing process of the pens.

Fourth, this invention is more rigorous than the prior art approach of measuring absolute optical density of a print sample. Because this invention looks for the change in optical density, it substantially reduces, if not eliminates, the effects induced by media type, ink type, and environmental conditions.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A method for measuring drop-volume in an ink-jet printhead, the printhead depositing multiple drops of ink to form printed images, the method comprising the following steps:

printing a series of print samples on a recording media, individual print samples being formed by depositing individual drops of ink;

the printing step including a step of changing a number of ink drops deposited in the individual print samples within the series to produce individual print samples with varying amounts of ink content;

analyzing the series of print samples to detect changes in ink content among the print samples; and determining drop-volume for the ink-jet printhead based upon the detected changes in ink content among the print samples within the series.

2. A method according to claim 1 wherein the step of changing the number of ink drops comprises depositing fewer ink drops in subsequent print samples within the series so that the print samples experience progressively greater ink depletion from initial print samples of the series to later print samples of the series.

3. A method according to claim 1 wherein the printing step comprises printing a series of print samples according to a set of corresponding predefined print patterns, individual patterns defining a desired number and position of ink drops for associated individual print samples.

4. A method according to claim 1 wherein the step of analyzing the print samples comprises visually observing the series of print samples to detect changes in optical density.

5. A method according to claim 1 wherein the step of analyzing the print samples comprises optically scanning the series of print samples to detect changes in optical density.

6. A method according to claim 1 further comprising:
   forming a character within the individual print samples to define a first print sample area covered by the character and a second print sample area not covered by the character; and
   changing the number of ink drops deposited within the second print sample area to selectively deplete the second print sample area of ink.

7. A method for measuring drop-volume in an ink-jet printhead, the printhead depositing drops of ink to form printed images, the method comprising the following steps:
   (a) depositing drops of ink from the ink-jet printhead onto a recording media to form a print sample, the print sample including a first print sample area defined by a character and a second print sample area outside of the character;
   (b) depositing drops of ink from the ink-jet printhead onto the recording media to form a subsequent print sample substantially similar to the print sample of step (a), but having fewer ink drops within the second print sample area;
   (c) repeating step (b) a selected number of times to print a series of print samples, subsequent print samples having increasingly fewer ink drops within the second print sample area as compared to previous print samples to incrementally reduce the volume of ink applied in the second print sample areas for the series of print samples;
   (d) optically scanning the series of print samples to detect contrast between the first print sample area and the second print sample area of individual print samples; and
   (e) determining nominal drop-volume for the ink-jet printhead in response to the detected contrast.

8. A method according to claim 7 wherein the series of print samples formed in steps (a)–(c) are printed according to a set of predefined print patterns that define a number of ink drops deposited in the first and second print sample areas for sequentially deposited print samples.

9. A method according to claim 7 wherein steps (a)–(c) comprise forming a bar-shaped character; and
   step (d) comprises optically scanning the print samples containing the bar-shaped characters using an electronic optical scanning means.

10. An ink-jet printing system comprising:
    a platen;
    an ink-jet printhead disposed adjacent to, but spaced from, the platen to permit passage of a recording media therebetween, the ink-jet printhead having multiple nozzles for depositing drops of ink onto the recording media to form printed images;
    an optical sensor having a light source oriented to emit a light beam toward the platen and a light sensitive detector aligned to detect reflected light;
    a memory for storing a plurality of test print patterns which define a number and position of multiple ink drops to be deposited by the printhead, individual test print patterns having a character region and a depletion region whereby the number and position of ink drops to be deposited in the depletion regions vary among the test print patterns;
    the ink-jet printhead being operable during a test mode to print a series of print samples according to the test print patterns stored in the memory, individual print samples having first print sample areas that are representative of the character regions of the test print patterns and second print sample areas that are representative of the depletion regions of the test print patterns, the printhead depositing a substantially constant number of ink drops within the first print sample areas and a varying number of ink drops within the second print sample areas so that the second print sample areas experience selected varying degrees of ink depletion as compared to the first print sample areas; and
    the optical sensor being operable during the test mode to scan the print samples to detect changes in optical density between the first print sample areas and the second print sample areas.

11. An ink-jet printing system according to claim 10 further comprising:
    a carriage configured to move bidirectionally across the platen, the carriage being spaced from the platen to permit passage of the recording media therebetween; and
    the ink-jet printhead and the optical sensor being mounted to the carriage to be operatively positionable over the recording media.

12. An ink-jet printing system according to claim 10 further comprising:
    a processor operatively coupled to the optical sensor to derive a drop-volume for the ink-jet printhead based upon the optically detected changes in the scanned print samples.

13. An ink-jet printing system according to claim 10 further comprising:
    a processor operatively coupled to the optical sensor to derive a drop-volume for the ink-jet printhead based upon the optically detected changes in the scanned print samples; and
    a control subsystem connected to control operating parameters of the ink-jet printing system that relate to depositing ink drops onto the recording media, the control subsystem automatically adjusting the system parameters in response to the drop-volume derived by the processor to yield a desired drop-volume for the ink-jet printhead.

* * * * *